Patented Nov. 12, 1935

2,020,854

UNITED STATES PATENT OFFICE 2,020,854

METHOD OF RECOVERING LITHIUM FROM ITS ORES

Walter Rosett, Oakcrest, Va., and Francis R. Bichowsky, Washington, D. C.

No Drawing. Application October 6, 1933, Serial No. 692,550

8 Claims. (Cl. 23—30)

(Filed but not issued under the act of March 3, 1883, as amended April 30, 1928; 370 O. G. 757)

This invention relates to a process for the recovery of lithium from ores thereof and has for its object to provide a simple, commercially feasible and efficient process for separating lithium from the minerals in which it occurs.

The usual method of obtaining lithium salts from ores containing lithia involves the continued roasting of those ores with sulphuric acid, the extraction of such roasts with water and the removal of aluminum, magnesium and calcium from the aqueous sulphate solutions by one of various means. The remaining impure solutions of lithium sulphate and the sulphates of the alkali metals are then treated to separate the lithium either as a sulphate or as a carbonate. These processes are expensive, consume much time and involve many chemical operations with resulting loss of materials. It is desirable to have the lithium separated out in the form of chloride and not as a sulphate or carbonate. The process we have invented involves the use of much cheaper chemicals and fewer processes, the lithium salt being the commercially desirable chloride.

We may use any of the common lithium bearing minerals such as lepidolite, spodumene, amblygomite, etc. The ore is finely ground and is mixed with a calcium-containing material such as calcium carbonate that yields calcium oxide, at least in part, on roasting, the calcium mineral being also comminuted, or calcium oxide itself may be used. The important feature is that the lithium ore is roasted in the presence of calcium oxide, whether produced during the roasting or added as such. If preferable, the ore of lithium and the calcium mineral may be mixed before grinding and be pulverized together, which results in an intimate mixture of the two, the proportion of the latter to the former being in general substantially two to one. The proportion of the calcium mineral being of course governed by the percentage of calcium contained thereby, it is obvious that a smaller quantity of a mineral high in calcium would be required than if the calcium percentage is low. In certain cases we add calcium chloride or calcium sulphate besides the material that supplies calcium oxide.

The mixture of powdered ore and calcium mineral is roasted in any of the well known types of kilns or furnaces at a temperature that will convert the calcium compounds into calcium oxide, which temperature is usually between 800° and 1000° C. The roasting is continued until the mass is completely clinkered, the coarse portions thereof being then ground to a size suitable for ready leaching. The clinker is then treated with hot water in any of the well known leaching devices, preferably being stirred the while to prevent caking. We have found that the countercurrent method of extraction is very satisfactory. The leaching may be done by treating with successive small quantities of water and in any case is continued until test of the clinker shows that it is substantially free of alkali salts.

The aqueous extract thus obtained is an alkaline solution of salts of lithium, potassium, sodium, rubidium, cæsium and calcium with a trace of iron and magnesium and perhaps other impurities. The major portion of the calcium is then precipitated either by adding to the extract a solution of a soluble carbonate or preferably by bubbling carbon dioxide gas therethrough. The solution will usually be sufficiently alkaline so that most of the calcium will be removed in this way but if not, small quantities of alkaline solution may be added thereto. The solution is then separated from the precipitated calcium carbonate by any of the well known methods and by the addition of a sufficient amount of commercial hydrochloric acid the solution is made neutral and the salts in solution are converted to chlorides. If the lithium is desired in the form of the nitrate or sulphate or other salt, the appropriate acid may be added in place of hydrochloric acid. The neutral solution so obtained will contain substantially only lithium, potassium, sodium, rubidium and cæsium chloride. For many purposes it is sufficient merely to concentrate such solution to make a commercially usable product. If the lithium is desired by itself, it may be separated in any feasible manner but preferably by the process disclosed in our copending companion application, Serial Number 697,308, filed November 9, 1933.

The invention described herein may be manufactured and used by or for the Government of the United States of America for governmental purposes, without the payment of any royalty thereon.

We claim:

1. A process for recovering lithium from its ores, consisting of the steps of intimately mixing comminuted ore with a calcium-containing material that yields calcium oxide, at least in part, on roasting, roasting said mixture at 800° to 1000° C. until clinkered, reducing the coarse clinker to a suitable size for leaching, leaching said clinker with hot water until the clinker is free of alkali salts, precipitating as a carbonate the calcium contained in the liquor, separating the liquor from said carbonate, and adding to said liquor an acid to form the desired salt of lithium.

2. A process for recovering lithium from its ores, consisting of the steps of mixing commiuted ore with calcium oxide, roasting said mixture at 800° to 1000° C. until clinkered, reducing the coarse clinker to a size suitable for leaching, leaching said clinker with hot water until the clinker is free of alkali salts, precipitating the calcium as a carbonate, separating the liquor from said carbonate, and neutralizing said liquor from said carbonate, and neutralizing said liquor by adding thereto an acid to form the desired salt of lithium.

3. A process for recovering lithium from its ores, consisting of the steps of roasting together comminuted lithium ore and a calcium-containing material that yields calcium oxide, at least in part, on roasting, roasting said mixture at 800° to 1000° C. until clinkered, reducing the coarse clinker to a size suitable for leaching, leaching said clinker with hot water, precipitating the calcium as a carbonate, separating said carbonate from the liquor, and adding to said liquor an acid to form the desired salt of lithium.

4. A process for recovering lithium from its ores, consisting of the steps of roasting a mixture of comminuted lithium ore and calcium oxide until clinkered, leaching said clinker with hot water until the clinker is free of alkali salts, precipitating the calcium as a carbonate, separating the liquor from said carbonate, and adding to said liquor an acid to form the desired salt of lithium.

5. A process for recovering lithium from its ores, consisting of the steps of roasting a mixture of comminuted lithium ore and calcium oxide until clinkered, extracting said clinker with hot water, precipitating the calcium in said liquor and separating the precipitate thus formed from said liquor and adding to said liquor an acid to form the desired salt of lithium.

6. A process for recovering lithium from its ores, consisting of the steps of roasting a mixture of comminuted lithium ore and a calcium-containing mineral that yields calcium oxide, at least in part, on roasting, said roasting being carried on at a temperature sufficient to produce calcium oxide and being continued until said mixture is clinkered, making an aqueous extract of said clinker, precipitating the calcium contained in said liquor, separating the precipitate thus formed from said liquor and neutralizing said liquor with an acid that will form the desired salt of lithium.

7. A process for recovering lithium from its ores, consisting of the steps of roasting the comminuted ore in the presence of calcium oxide to form a clinker, making an aqueous extract of said clinker, and adding an acid to said extract and thereby separating the lithium in the form of a salt of such acid.

8. A process for recovering lithium from its ores, consisting of the steps of reducing the ore to particles of suitable size, roasting the ore with calcium oxide to form a clinker, making an aqueous extract of said clinker, and adding an acid to said extract and thereby separating the lithium in the form of a salt of such acid.

WALTER ROSETT.
FRANCIS R. BICHOWSKY.